United States Patent
Wolanin

[11] 3,715,909
[45] Feb. 13, 1973

[54] METHOD AND APPARATUS FOR DETERMINING BEARING PRELOAD IN A GEAR TRAIN

[75] Inventor: Michael J. Wolanin, Sterling Heights, Mich.

[73] Assignee: General Motors Corporation, Detroit, Mich.

[22] Filed: Dec. 6, 1971

[21] Appl. No.: 205,179

[52] U.S. Cl. ............................73/9, 73/118, 73/162
[51] Int. Cl. ...........................................G01m 13/02
[58] Field of Search............................73/9, 162, 118

[56] References Cited

UNITED STATES PATENTS

| 3,059,464 | 10/1962 | Deane | 73/9 |
| 2,674,125 | 4/1954 | Eagan | 73/136 R |

FOREIGN PATENTS OR APPLICATIONS 523,534   4/1955   Italy ........................................73/162

Primary Examiner—Louis R. Prince
Assistant Examiner—Denis E. Corr
Attorney—E. W. Christen et al.

[57] ABSTRACT

An angular accelerometer is connected to a gear train so as to measure the deceleration of one of two meshed gears having backlash as the gears move independently of each other during the period after rotational power input to the gear train is disconnected when the backlash is taken up. The only resisting torque exerted on the one gear during the backlash takeup period is the drag torque of the preloaded bearings rotatably supporting it which varies directly with the bearing preload. The drag torque is determined from the measured deceleration and from this drag torque the bearing preload is determined.

7 Claims, 4 Drawing Figures

PATENTED FEB 13 1973 3,715,909

METHOD AND APPARATUS FOR DETERMINING BEARING PRELOAD IN A GEAR TRAIN

This invention relates to the measurement of preload on a bearing supporting a rotatable member and more particularly to the determination of the preload on a bearing supporting a gear in a gear train.

Gears in a gear train are normally rotatably supported by bearings that are intentionally preloaded by a compressive axial force. Such force may, for example, be effected by an interference fit of the bearing between the structure supporting one race of the bearing and that supporting the other race. For a given gear train application, it is desirable that the preloads fall within a given range for best bearing operation. Such preloads however, have heretofore been difficult to ascertain. The methods heretofore available for measuring preload have not only been time consuming and influenced by operator error, but they have also often required dismantling certain parts of the assembly normally affecting the preload in order to permit the insertion of preload measuring apparatus. Moreover, the nature of the preload measuring method and apparatus has heretofore not normally permitted their use to inspect assembled gear trains on an automated line. For example, the practice commonly used to determine the preload on the side bearings supporting a differential carrier assembly in a conventional vehicle differential assembly requires that the differential carrier assembly be removed from the differential assembly and replaced therein with apparatus for measuring the strain on the side bearings still retained in the differential.

To determine the preload on bearings rotatably supporting one of two meshed gears in a gear train having normal backlash between gear teeth, the present invention provides a method and apparatus wherein the gear having the faster inherent deceleration is connected to receive input power and drives the gear having the slower inherent deceleration. The input power is then disconnected to allow the faster decelerating gear to take up the backlash relative to the slower decelerating gear, and the deceleration of one of the gears is measured as the gears rotate out of contact with each other during the momentary period that the backlash is taken up. The drag torque and bearing preload of the bearings supporting the one gear are then determined from the measured deceleration.

The invention is illustrated measuring the preload on a pair of side bearings supporting a differential carrier assembly in the housing of a conventional vehicle differential. A ring gear connected to the differential carrier assembly is driven by a pinion gear that is clutched to a source of rotational input power. To measure the deceleration of the differential carrier after the rotational input power has been connected and then disconnected, the input shaft of an angular accelerometer is extended through one axle shaft opening in the differential housing and is drivingly connected to the differential carrier in an area which is normally later occupied by one of the axle shafts. The pinion has a greater inherent deceleration than the carrier assembly due to the difference in the drag torques respectively exerted thereon and also the difference in rotational inertias. The difference in decelerations induces the gears to be free of each other during the momentary period after power removal so that the backlash between the gears is taken up, and the angular accelerometer measures the deceleration of the carrier assembly during this momentary period. The preload on the side bearings is determined from the measured deceleration, knowing that the only torque resisting rotation of the carrier assembly during the backlash takeup period is the drag torque exerted by the side bearings and knowing that the drag torque of the bearings varies directly with bearing preload.

It is therefore an object of the present invention to provide a method and apparatus for measuring the drag torque on bearings supporting two gears meshed in a gear train having backlash by inducing the gears to momentarily rotate freely of each other to take up the backlash between the gears and measuring the deceleration of one of the gears while the backlash is being taken up.

It is another object of the present invention to provide a method and apparatus of the foregoing type wherein rotational input power is connected to the gear having the greater inherent deceleration and the deceleration of either or both gears is measured during the momentary interval that the faster gear rotates to take up the backlash.

It is another object of the present invention to provide an apparatus for measuring the preload on a bearing rotatably supporting one of two meshed gears in a gear train having backlash where the apparatus includes a source of selectively connectible rotational input power and deceleration detection apparatus and wherein the rotational input is connected to drive the gear train and is disconnected to induce takeup of the backlash and the deceleration measuring apparatus is driven by the one gear and measures its deceleration while momentarily out of contact with the rest of the gear train as the backlash is taken up.

It is another object of the present invention to provide a method and apparatus of the foregoing type wherein the one gear is connected to the differential carrier of a differential housing, the housing having an opening through which an axle shaft is later inserted, and the detection apparatus is drivingly connected to the carrier assembly through the opening and measures the deceleration of the carrier assembly during the period that the second gear decelerates faster and takes up the backlash relative to the first.

These and other features and objects of the present invention will become more apparent with reference to the following description taken in conjunction with the accompanying drawing wherein.

Figure 1:
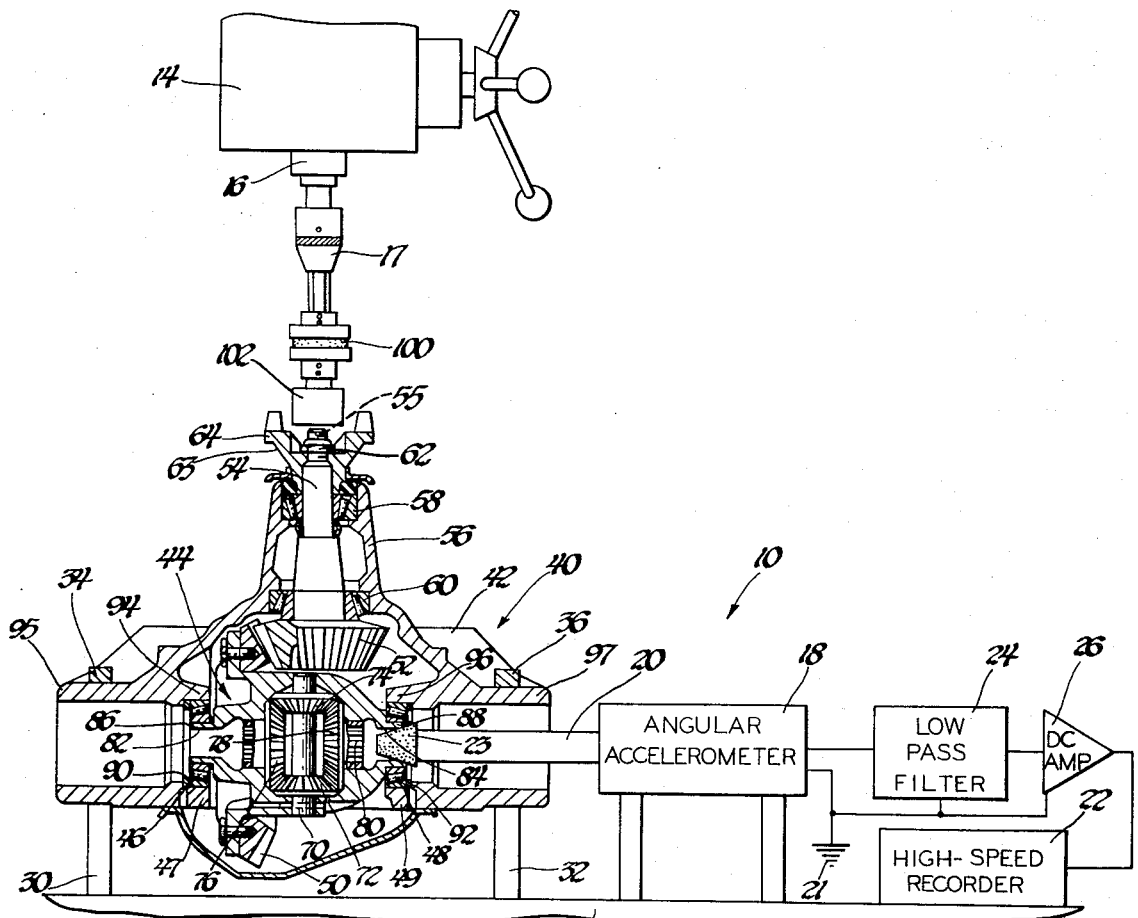
FIG. 1 is a view partly in cross-section and partly in schematic of detection apparatus according to the present invention connected to measure bearing preload in a vehicle differential.

With reference now to FIG. 1, there is shown detection apparatus 10 for measuring the preload on bearings in a gear train. Apparatus 10 includes a work table 12, a motor 14 having a translatable spindle 16 as in a drill press, and an angular accelerometer 18 having an input shaft 20 for detecting deceleration of the gear train and providing an electrical output to a high speed recorder 22 through a low pass filter 24 and a DC amplifier 26.

The gear train whose bearing preload is to be measured, such as a conventional vehicle differential assembly 40, is supported on work table 12 by supports 30 and 32 and is clamped thereto by clamps 34 and 36. The differential includes a differential housing 42, a differential carrier assembly 44 rotatably supported therein on side bearings 46 and 48, bearing caps 47 and 49 bolted to housing 42 to hold bearings 46 and 48 therein, and a ring gear 50 drivingly connected with carrier assembly 44. For driving ring gear 50, assembly 40 further includes a pinion 52 having a shaft 54 rotatably supported in a pinion boss 56 by pinion bearings 58 and 60. A nut 62 is threaded on the end of shaft 54 against a flange 64 to preload pinion bearings 58 and 60 in pinion boss 56, flange 64 being normally connected by a drive line (not shown) to the output of an internal combustion engine-driven transmission.

Differential carrier assembly 44 carries on a pinion shaft 70 a pair of differential pinions 72 and 74 meshed with side gears 76 and 78 having splined bores 80 for subsequently receiving and driving wheel axle shafts (not shown) later inserted through side openings 82 and 84 in carrier hubs 86 and 88 on which are seated the inner races of side bearings 46 and 48. The outer races of side bearings 46 and 48 are seated and shimmed by shims 90 and 92 in housing bosses 94 and 96 having outwardly extending portions 95 and 97 into which axle shaft tubes (not shown) are later welded. Since axle shaft tubes are welded into axle shaft tube bosses 95 and 97 and axle shafts are inserted into splined bores 80 of side gears 76 and 78 at subsequent stages of assembly, it will be recognized that FIG. 1 illustrates differential assembly 40 in an intermediate, rather than final, stage of assembly. At this stage, standard-sized shims 90 and 92 have been inserted to effect on side bearings 46 and 48 a preload that should fall within a specified range.

The detection apparatus according to the present invention readily permits the determination of the actual preloads on bearings 46 and 48 at this intermediate stage of assembly to check whether they fall within specifications. In the detection apparatus, rotational input power is connected to that gear train member, here pinion 52, having the greater inherent deceleration which in turn drives the member, here carrier assembly 44, having the slower inherent deceleration. The input power is applied to and then rapidly disconnected from pinion nut 62 by motor 14 and translatable spindle 16 through a rubber coupling 100 and a socket 102 that drivingly engages and disengages pinion nut 62 on spindle translation.

Figure 2:
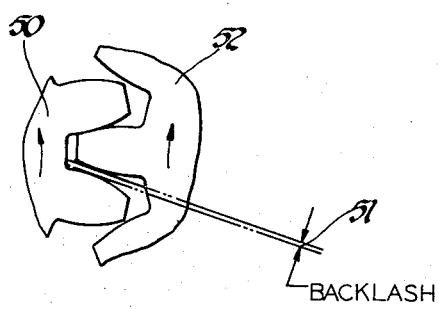
FIG. 2 is an enlarged view of the meshing teeth of the pinion and ring gears of the differential of FIG. 1.

As may be better seen with reference to FIG. 2, when pinion 52 drives ring gear 50, a backlash 51 normally exists between the teeth thereof with their rotations in the directions indicated by the arrows. Backlash 51 is taken up when the rotational input is disconnected from pinion shaft 54 since pinion 52 decelerates faster than carrier assembly 44. During the period that backlash 51 is taken up after the disconnection of rotational input power, the only substantial torque resisting the rotation of carrier assembly 44 is the drag torque applied thereto by side bearings 46 and 48. Knowing the rotational inertia of carrier assembly 44 and knowing that the bearing drag torque exerted on the carrier assembly is proportional to the product of its rotational inertia about its rotational axis times its deceleration in the presence of just this drag torque permits the drag torque of the carrier assembly bearings to be computed from the measured deceleration. Moreover, knowing that the preloads vary directly with drag torque, the preload can also be determined directly from the measured deceleration. In short, inducing faster decelerating pinion 52 to drive and later take up the backlash relative to slower decelerating ring gear 50 allows pinion 52 to momentarily rotate freely of ring gear 50 and isolates the drag torque exerted on carrier assembly 44 by side bearings 46 and 48.

As has been indicated, the establishment of the backlash takeup condition requires that the power input be connected to that gear train member having the greater inherent deceleration so that, after driving the inherently slower decelerating gear, the faster decelerating gear rotates relative to the slower and allows the preloads on the bearings to be measured while the gears are momentarily free of each other during backlash takeup. For the gear train and measuring apparatus shown, pinion 52 decelerates faster than carrier assembly 44 since the ratio of the drag torque exerted on pinion 52 by pinion bearings 58 and 60 when divided by the rotational inertia of pinion 52 is greater than the ratio of the drag torque exerted by side bearings 46 and 48 on carrier assembly 44 divided by its rotational inertia. In other words from $T = I\alpha$:

$$(\alpha_p/\alpha_c) > 1: (T_p/I_c) > (T_c/I_c)$$

where $\alpha_p$ and $\alpha_c$ are the angular accelerations of the pinion and carrier respectively, $T_p$ and $T_c$ are the drag torques exerted thereon by their respective bearings and $I_p$ and $I_c$ are their moment of inertias respectively about their rotational axes.

The deceleration of carrier assembly 44 during the backlash takeup period is measured by angular accelerometer 18. This accelerometer is of the type which produces an output voltage directly proportional to the angular deceleration of input shaft 20 and may, for example, be a conventional Model 146-A accelerometer obtainable from the Hoodwind Instrument Company of Sawyer, Michigan. Input shaft 20 of this accelerometer drives a metal disc armature (not shown) which is situated in a magnetic field. As the disc rotates, currents are generated in the disc that are proportional to its angular velocity. These currents produce magnetic fields which are coupled to pickup coils (not shown). The voltages induced in the coils are proportional to the rate of change of the magnetic fields of the disc and therefore the deceleration of input shaft 20.

Angular accelerometer 18 produces an output which when referenced to electrical ground 21 contains high frequency noise generated by the metal-to-metal sliding contact of the teeth of the ring gear 50 and pinion 52. The components of this noise above a frequency of 200 Hz are filtered by a conventional low pass filter 24 which may, for example, be a Model 308-A variable electronic filter made by the Spencer Kennedy Laboratories of Boston, Massachusetts. The output of low pass filter 24 is applied to the conventional high speed recorder 22 through a conventional DC amplifier 26 having a variable gain to calibrate the entire system while also protecting high speed recorder 22 from damaging effects that might otherwise be caused by excessive current flow and also amplifying the output of filter 24 to drive the recorder.

As has been explained above, determining preload with the method and apparatus of the present invention requires the measurement and recording of the deceleration of differential carrier assembly 44 during the momentary interval that pinion 52 decelerates and takes up the backlash relative to ring gear 50. Because this transition is very rapid, the instrumentation apparatus must have a fast time response. In this regard, it has been found that a conventional oscillograph recorder such as a Honeywell Model 906-C "Visicorder" when equipped with a conventional light beam galvonometer such as a Honeywell Model M-1650, satisfactorily measures and records deceleration in the ranges encountered in the differentials tested. The Honeywell Model 104 DC amplifier, Model 906-Z oscillograph recorder, and Model 1650 light beam galvonometer are components available from the Honeywell Corporation of Minneapolis, Minnesota.

In operation, the differential assembly 40 to be tested is suitably secured and located on table 12 relative to motor 14 by clamps 34 and 36 clamping axle tube bosses 94 and 96 to supports 30 and 32. However, due to the weight of the carrier assembly 44, low clamping force is required resulting in very little carrier strain and distortion. Centering of differential assembly 40 with respect to motor 14 is provided by a center (not shown) secured in spindle 16 by a chuck 17 cooperating with a center hole 55 in pinion shaft 54 to which nut 62 is drivingly secured. The center is then removed and replaced with rubber coupling 100 and socket 102. Accelerometer input shaft 20 has a rubber tip 23 at the end thereof which is drivingly and frictionally inserted into side opening 84 of carrier assembly 44 through axle shaft tube boss 97. Spindle 16 is then lowered so that socket 102 engages nut 62, and the motor is then actuated to rotate carrier assembly 44. With detection apparatus 10 including accelerometer 18, low pass filter 24, DC amplifier 26 and high speed recorder 22 activated to measure subsequent deceleration of carrier assembly 44, spindle 16 is then retracted to disconnect rotational power input from nut 62.

Figure 3:
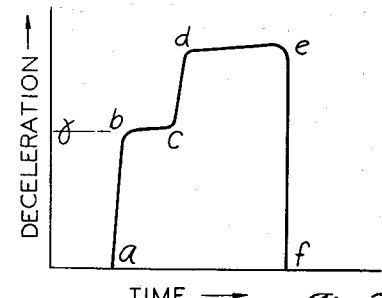
FIG. 3 is a graph showing the time versus deceleration characteristics of the differential assembly of FIG. 1 before, during, and after the period that the pinion is induced to take up the backlash.

As may be better understood with reference to FIG. 3, two relatively distinct periods of deceleration follow this disconnection of rotational input power: $a$–$b$–$c$ and $c$–$d$–$e$–$f$. In the first period, $a$–$b$–$c$, the greater inherent deceleration of pinion 52 relative to carrier assembly 44 due to the difference in rotational inertias and preloads causes the teeth of pinion 52 to decelerate and take up the backlash 51 relative to the teeth of ring gear 50. In the first portion of this period, $a$–$b$, the deceleration of carrier assembly 44 rapidly increases to its inherent deceleration level as effected substantially by the drag torque of side bearings 46 and 48. During the second portion of this backlash takeup period, $b$–$c$, the deceleration of carrier assembly 44 increases only slightly due to the slightly increasing drag torque of bearings 46 and 48 as they slow down. This second portion of the backlash takeup period continues until the backlash is completely taken up which occurs at point $c$. In the first portion, $c$–$d$, of the subsequent period, $c$–$d$–$e$–$f$, pinion 52 again engages ring gear 50 but now is driven thereby and the deceleration of the combined assemblies rapidly increases to the inherent deceleration of the combined assemblies as determined substantially by the preloads on side bearings 46 and 48 and pinion bearings 58 and 60. In the next portion, $d$–$e$, the deceleration of the combined units increases slightly again due to the increased drag torque associated with decreasing speed. This inherent deceleration of the combined units continues until they stop at which point the deceleration rapidly falls to zero as shown by the portion $e$–$f$.

Figure 4:
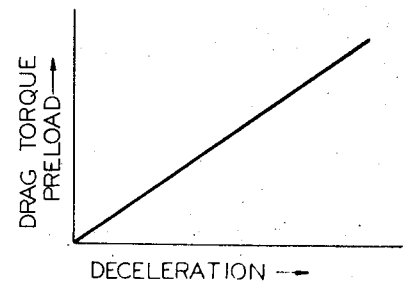
FIG. 4 is a graph showing a deceleration versus preload characteristic from which the preload on the bearings supporting the carrier assembly of FIG. 1 is determined.

The drag torque exerted on carrier assembly 44 by side bearings 46 and 48 is determined from the deceleration thus measured and recorded during the $b$–$c$ portion of the backlash takeup period which portion is attributable to only the side bearing preload. The drag torque may be either computed or may be read from a characteristic such as shown in FIG. 4. This characteristic shows a plot of deceleration measurements made by the apparatus of this invention versus preload measurements made by a different preload measuring method on a group of like differential assemblies of the same design as that shown in FIG. 1.

Furthermore, the power input and the measurement apparatus can be connected at other points of the gear train. For example, should it be desired to measure the preload on pinion bearings 58 and 60, power is connected and disconnected as described previously and accelerometer input shaft 20 is connected to be driven by pinion 52, such as for example, at a tapered shoulder 63 of pinion flange 64, to measure the deceleration of pinion 52 resulting from the drag torque exerted thereon by bearings 58 and 60 while pinion 52 takes up the backlash relative to ring gear 50.

It is also understood that bearing preloads could also be measured with power connected and disconnected to the gear train member having the inherently slower deceleration provided that the deceleration of the member having the inherently faster deceleration is reduced for measuring purposes below that of the slower member, such as for example, by adding sufficient rotational mass to the member having the otherwise faster inherent deceleration.

Thus, while having described one embodiment of the present invention, it is understood that specific terms and examples are employed in a descriptive sense only and not for the purpose of limitation. Other embodiments of the invention, modifications thereof and alternatives thereto may be used. I therefore aim in the appended claims to cover such modifications and changes as fall within the true spirit and scope of my invention.

What I claim as new and desire to secure by Letters Patent of the United States is:

It is claimed:

1. A method of determining the drag torque exerted by bearings supporting meshing gears in a gear train wherein there is a certain backlash between the teeth of the meshing gears and the meshing gears have different decelerations, the method comprising the steps:

a. connecting a rotational power input to the gear train;
b. disconnecting the rotational power input from the gear train so that the gears momentarily rotate freely of each other while the backlash between the gears is taken up because of their different decelerations;
c. measuring the deceleration of one of the meshing gears while the backlash is being taken up; and
d. determining the drag torque of the bearing supporting the one gear from the measured deceleration.

2. A method of determining the preload on preloaded bearings supporting two gears meshed in a gear train wherein there is a certain backlash between the teeth of these gears and wherein each of these gears has a drag torque exerted thereon by its supporting bearing and has a rotational inertia such that the ratio of the drag torque exerted on one gear by its supporting bearing to its rotational inertia is greater than the ratio for the other gear so that the one gear has a greater inherent deceleration than the other, the method comprising the steps:

a. connecting a rotational power input to drive the gear having the greater inherent deceleration and thus drive the other gear;
b. disconnecting the rotational power input so that the gear having the greater inherent deceleration momentarily rotates relative to the other to take up the backlash between the gears;
c. measuring the deceleration of one of the gears while the backlash is being taken up; and
e. determining the preload on the bearing supporting the gear whose deceleration was measured from the measured deceleration.

3. A method for determining the drag torque on preloaded bearings rotatably supporting a differential carrier assembly or a pinion gear in a differential housing, the carrier assembly including a ring gear enmeshed with the pinion gear and the ring gear and pinion gear comprising a portion of a gear train wherein there is a certain backlash between the teeth of these gears and wherein the pinion gear has a faster inherent deceleration than the carrier assembly, the method comprising the steps of:

a. connecting deceleration measuring means to either the pinion gear or the carrier assembly for measuring the deceleration thereof when rotational power input is removed from the pinion gear;
b. connecting a rotational power input to drive the pinion gear and thus drive the differential carrier assembly through the ring gear;
c. disconnecting the rotational power input from the pinion gear so that the pinion gear rotates relative to the ring gear to take up the backlash relative thereto because of the said faster inherent deceleration of the pinion gear;
d. measuring by the deceleration measuring means the deceleration of said either one of the pinion gear or the carrier assembly during the momentary interval that the pinion gear takes up the backlash relative to the ring gear; and
e. determining the drag torque of the bearings supporting either the pinion gear or the carrier assembly whose deceleration was measured from the measured deceleration.

4. A method for determining the preload on side bearings seated in a housing of a differential assembly and rotatably supporting a carrier assembly carrying differential gears including a side gear, the differential housing having an axle shaft opening through which an axle shaft is subsequently drivingly connected with said side gear, said carrier assembly having a ring gear drivingly connected thereto and meshed with a pinion gear also rotatably supported in the differential housing by pinion bearings, the ring gear and the pinion gear having a certain backlash between the teeth thereof and the carrier assembly having a different rotational inertia about its axis than the pinion and the side bearings and pinion bearing exerting drag torques on the carrier assembly and pinion gear, the ratio of the drag torque exerted on the carrier assembly by said side bearing to its rotational inertia being greater than the ratio for the pinion gear so that the pinion gear may be induced to decelerate faster than the carrier assembly and take up the backlash relative thereto, the method comprising the steps of:

a. drivingly connecting an input shaft of a deceleration measuring apparatus to the carrier assembly through said axle shaft opening in said differential housing before said axle shafts are connected with said side gear;
b. connecting a rotational power input to said pinion to drive the pinion and therethrough the carrier assembly;
c. disconnecting said rotational power input from said pinion so that the pinion rotates relative to the ring gear and takes up the backlash relative thereto because of the faster inherent deceleration of the pinion relative to the carrier assembly;
d. measuring the deceleration of said input shaft of said deceleration measuring means to measure the deceleration of said carrier assembly; and
e. determining drag torque of the side bearings supporting the carrier assembly from the measured deceleration.

5. Apparatus for determining the magnitude of drag torque exerted by bearings supporting two gears meshed in a gear train wherein one of the gears has a greater inherent deceleration than the other and there is a certain backlash between the teeth of the gears, the apparatus comprising:

a. rotational power input means for providing rotational power input to said gear train when clutched thereto;
b. clutch means for connecting and disconnecting said rotational power input means and said gear having the greater inherent deceleration to thus drive the other gear;
c. deceleration measuring means drivingly connected with either one of said gears for measuring the deceleration of the connected gear due to the drag torque exerted thereon by its bearing when said clutch means disconnects said rotational power input means from said gear having the greater inherent deceleration and said gears momentarily rotate freely of each other while the backlash between the gears is taken up because of their different inherent decelerations.

6. Apparatus for determining the drag torque exerted by preloaded bearings rotatably supporting two gears meshed in a gear train wherein there is a certain backlash between the teeth of the two gears and wherein each of these gears has different rotational inertia and a different drag torque exerted thereon by its supporting bearing so that the ratio of the drag torque exerted on one gear by its supporting bearing to its rotational inertia is greater than the ratio for the other gear, the difference in said ratios effecting an inherently greater deceleration for the one gear than the other, the apparatus comprising:
 a. gear carrier housing means seating said bearings and housing said gear train, said housing having an opening communicating with either one of said gears;
 b. rotational power input means for connecting and disconnecting rotational power input and said gear train;
 c. clutch means for connecting and disconnecting said rotational power input means to the gear having the greater inherent deceleration to thus drive the other gear, said clutch means when disconnecting said rotational power input allowing said one gear to momentarily rotate freely relative to the other while the backlash between the gears is taken up because of their different inherent decelerations;
 d. deceleration detection means including an input shaft connected to said either one gear through said opening of said gear train housing for measuring the deceleration of the connected gear due to the drag torque exerted thereon by its supporting bearing when said rotational power input means are disconnected by said clutch means from said gear train and the gear having the greater inherent deceleration rotates relative to the other gear.

7. Apparatus for measuring the preload on preloaded side bearings rotatably supporting a differential carrier assembly in a differential housing of a vehicle differential, the carrier assembly having a ring gear drivingly connected thereto and including differential gearing including a side gear, said differential housing having an axle shaft side opening through which an axle shaft is subsequently drivingly connected with said side gear, a pinion rotatably supported in said differential housing meshed with said ring gear, the teeth of said ring gear and pinion gear having a certain backlash therebetween, said pinion assembly having faster inherent deceleration than said carrier assembly, the apparatus comprising:
 a. rotational power input means for applying rotational input power to said pinion when said power input means is clutched thereto and for inducing said pinion to decelerate relative to said ring gear and take up the backlash relative thereto when said rotational power input means is declutched from said pinion;
 b. clutch means for selectively clutching said rotational power input means and said pinion; and
 c. deceleration detection means including an input shaft connected to said side gear through said axle shaft opening in said differential housing for measuring the deceleration of said carrier assembly when said clutch means declutches said rotational power input from said pinion and said pinion decelerates relative to said ring gear and takes up the backlash relative thereto, said deceleration measuring means further including high speed recorder means for indicating the deceleration of said carrier assembly after said rotational input power means are declutched from said pinion.

* * * * *